US011996109B2

(12) United States Patent
Vasilache

(10) Patent No.: US 11,996,109 B2
(45) **Date of Patent: *May 28, 2024**

(54) SELECTION OF QUANTIZATION SCHEMES FOR SPATIAL AUDIO PARAMETER ENCODING

(71) Applicant: Nokia Technologies Oy, Espoo (FI)

(72) Inventor: Adriana Vasilache, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,151

(22) Filed: Dec. 23, 2022

(65) Prior Publication Data

US 2023/0129520 A1 Apr. 27, 2023

Related U.S. Application Data

(63) Continuation of application No. 17/281,393, filed as application No. PCT/FI2019/050675 on Sep. 20, 2019, now Pat. No. 11,600,281.

(30) Foreign Application Priority Data

Oct. 2, 2018 (GB) ..................................... 1816060

(51) Int. Cl.
*G10L 19/038* (2013.01)
*G10L 19/022* (2013.01)
(Continued)

(52) U.S. Cl.
CPC .......... *G10L 19/038* (2013.01); *G10L 19/022* (2013.01); *G10L 21/0224* (2013.01); *G10L 21/0232* (2013.01); *G10L 2019/0001* (2013.01)

(58) Field of Classification Search
CPC ................. G10L 19/038; G10L 19/022; G10L 2019/0001
See application file for complete search history.

(56) References Cited

U.S. PATENT DOCUMENTS

| | | | |
|---|---|---|---|
| 5,398,069 | A | 3/1995 | Huang et al. |
| 2008/0015852 | A1 | 1/2008 | Kruger et al. |

(Continued)

FOREIGN PATENT DOCUMENTS

| | | | |
|---|---|---|---|
| KR | 2013-0112871 | A | 10/2013 |
| WO | 2019/091575 | A1 | 5/2019 |
| WO | 2020/008105 | A1 | 1/2020 |

OTHER PUBLICATIONS

Search Report received for corresponding United Kingdom Application No. 1816060.6 , dated Mar. 27, 2019, 4 pages.

(Continued)

*Primary Examiner* — Shaun Roberts
(74) *Attorney, Agent, or Firm* — Nokia Technologies Oy

(57) ABSTRACT

There is disclosed inter alia an apparatus for spatial audio signal encoding comprising means for receiving for each time frequency block of a sub band of an audio frame a spatial audio parameter comprising an azimuth and an elevation; determining a first distortion measure for the audio frame by determining a first distance measure for each time frequency block and summing the first distance measure for each time frequency block; determining a second distortion measure for the audio frame by determining a second distance measure for each time frequency block and summing the second distance measure for each time frequency block, and selecting either the first quantization scheme or the second quantization scheme for quantising the elevation and the azimuth for all time frequency blocks of the sub band of the audio frame, wherein the selecting is dependent on the first and second distortion measures.

14 Claims, 4 Drawing Sheets

(51) Int. Cl.

| | |
|---|---|
| ***G10L 21/0224*** | (2013.01) |
| ***G10L 21/0232*** | (2013.01) |
| *G10L 19/00* | (2013.01) |

(56) References Cited

U.S. PATENT DOCUMENTS

| | | | |
|---|---|---|---|
| 2013/0151263 | A1 | 6/2013 | Lee et al. |
| 2014/0355766 | A1 | 12/2014 | Morrell et al. |
| 2015/0213809 | A1 | 7/2015 | Peters et al. |
| 2015/0332682 | A1 | 11/2015 | Kim et al. |
| 2016/0142851 | A1 | 5/2016 | Sun et al. |
| 2017/0011751 | A1 | 1/2017 | Fueg et al. |
| 2017/0103766 | A1 | 4/2017 | Kim et al. |
| 2017/0178649 | A1 | 6/2017 | Sung |
| 2017/0309280 | A1 | 10/2017 | Friedrich et al. |

OTHER PUBLICATIONS

International Search Report and Written Opinion received for corresponding Patent Cooperation Treaty Application No. PCT/FI2019/050675, dated Dec. 4, 2019, 16 pages.

Li et al., "The Perceptual Lossless Quantization of Spatial Parameter for 3D Audio Signals", International Conference on Multimedia Modeling, Lecture Notes in Computer Science, vol. 10133, 2017, pp. 381-392.

Cheng et al., "A General Compression Approach to Multi-Channel Three-Dimensional Audio", IEEE Transactions on Audio, Speech, and Language Processing, vol. 21, No. 8, Aug. 2013, pp. 1676-1688.

Gao et al., "Azimuthal Perceptual Resolution Model BasedAdaptive 3D Spatial Parameter Coding", International Conference on Multimedia Modeling, Lecture Notes in Computer Science, vol. 8935, 2015, pp. 534-545.

Office action received for corresponding Indian Patent Application No. 202147019016, dated Feb. 11, 2022, 7 pages.

Extended European Search Report received for corresponding European Patent Application No. 19868792.3, dated May 27, 2022, 8 pages.

Notice of Allowance received for corresponding U.S. Appl. No. 17/281,393, dated Oct. 26, 2022, 14 pages.

Office action received for corresponding Korean Patent Application No. 2021-7013079, dated Mar. 17, 2023, 5 pages of office action and 3 pages of translation available.

SELECTION OF QUANTIZATION SCHEMES FOR SPATIAL AUDIO PARAMETER ENCODING

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as spread coherence, surround coherence, number of directions, distance etc) for an audio codec. For example, these parameters can be estimated from microphone-array captured audio signals, and for example a stereo signal can be generated from the microphone array signals to be conveyed with the spatial metadata. The stereo signal could be encoded, for example, with an AAC (Advanced Audio Coding) encoder. A decoder can decode the audio signals into PCM (Pulse Code Modulation) signals, and process the sound in frequency bands (using the spatial metadata) to obtain the spatial output, for example a binaural output.

The aforementioned solution is particularly suitable for encoding captured spatial sound from microphone arrays (e.g., in mobile phones, VR (Virtual Reality) cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field.

A further input for the encoder is also multi-channel loudspeaker input, such as 5.1 or 7.1 channel surround inputs.

However with respect to the directional components of the metadata, which may comprise an elevation, azimuth (and energy ratio which is 1-diffuseness) of a resulting direction, for each considered time/frequency subband. Quantization of these directional components is a current research topic, and using as few bits as possible represent them remains advantageous to any coding scheme.

SUMMARY

There is provided according to a first aspect an apparatus comprising means for: receiving for each time frequency block of a sub band of an audio frame a spatial audio parameter comprising an azimuth and an elevation; determining a first distortion measure for the audio frame by determining a first distance measure for each time frequency block and summing the first distance measure for each time frequency block, wherein the first distance measure is an approximation of a distance between the elevation and azimuth and a quantized elevation a quantized azimuth according to a first quantisation scheme; determining a second distortion measure for the audio frame by determining a second distance measure for each time frequency block and summing the second distance measure for each time frequency block, wherein the second distance measure is an approximation of a distance between the elevation and azimuth and a quantized elevation and a quantized azimuth according to a second quantisation scheme; and selecting either the first quantization scheme or the second quantization scheme for quantising the elevation and the azimuth for all time frequency blocks of the sub band of the audio frame, wherein the selecting is dependent on the first and second distortion measures.

The first quantization scheme may comprise on a per time frequency block basis means for: quantizing the elevation by selecting a closest elevation value from a set of elevation values on a spherical grid, wherein each elevation value in the set of elevation values is mapped to a set of azimuth values on the spherical grid; and quantizing the azimuth by selecting a closest azimuth value from a set of azimuth values, where the set of azimuth values is dependent on the closest elevation value.

The number of elevation values in the set of elevation values may be dependent on a bit resolution factor for the sub frame, and wherein the number of azimuth values in the set of azimuth values may be mapped to each elevation value is also dependent on the bit resolution factor for the sub frame.

The second quantisation scheme may comprise means for: averaging the elevations of all time frequency blocks of the sub band of the audio frame to give an average elevation value; averaging the azimuths of all time frequency blocks of the sub band of the audio frame to give an average azimuth value; quantising the average value of elevation and the average value of azimuth; forming a mean removed azimuth vector for the audio frame, wherein each component of the mean removed azimuth vector comprises a mean removed azimuth component for a time frequency block wherein the mean removed azimuth component for the time frequency block is formed by subtracting the quantized average value of azimuth from the azimuth associated with the time frequency block; and vector quantising the mean removed azimuth vector for the frame by using a codebook.

The first distance measure may comprise a L2 norm distance between a point on a sphere given by the elevation and azimuth and a point on the sphere given by the quantized elevation and quantized azimuth according to the first quantization scheme.

The first distance measure may be given by $1-\cos\hat{\theta}_i\cos\theta_i\cos(\Delta\phi_i)-\sin\theta_i\sin\hat{\theta}_i$, wherein $\theta_i$ is the elevation for a time frequency block i, wherein $\hat{\theta}_i$ is the quantized elevation according to the first quantization scheme for the time frequency block i and wherein $\Delta\phi_i$ is an approximation of a distortion between the azimuth and the quantized azimuth according to the first quantisation scheme for the time frequency block i.

The approximation of the distortion between the azimuth and the quantized azimuth according to the first quantization scheme may be given as 180 degrees divided by $n_i$, wherein $n_i$ is the number of azimuth values in the set of azimuth values corresponding to the quantized elevation $\hat{\theta}_i$ according to the first quantization scheme for the time frequency block i.

The second distance measure may comprise a L2 norm distance between a point on a sphere given by the elevation and azimuth and a point on the sphere given by the quantized elevation and quantized azimuth according to the second quantization scheme.

The second distance measure may be given by $1-\cos\theta_{av}\cos\theta_i\cos(\Delta\phi_{CB}(i))-\sin\theta_i\sin\theta_{av}$, wherein $\theta_{av}$ is the quantized average elevation according to the second quantization scheme for the audio frame, $\theta_i$ is the elevation for a time frequency block i and $\Delta\phi_{CB}(i)$ is an approximation of the distortion between the azimuth and the azimuth component of the quantised mean removed azimuth vector according to the second quantization scheme for the time frequency block i.

The approximation of the distortion between the azimuth and the azimuth component of the quantised mean removed azimuth vector according to the second quantization scheme for the time frequency block i may be a value associated with the codebook.

According to a second aspect there is provided a method comprising: receiving for each time frequency block of a sub band of an audio frame a spatial audio parameter comprising an azimuth and an elevation; determining a first distortion measure for the audio frame by determining a first distance measure for each time frequency block and summing the first distance measure for each time frequency block, wherein the first distance measure is an approximation of a distance between the elevation and azimuth and a quantized elevation a quantized azimuth according to a first quantisation scheme; determining a second distortion measure for the audio frame by determining a second distance measure for each time frequency block and summing the second distance measure for each time frequency block, wherein the second distance measure is an approximation of a distance between the elevation and azimuth and a quantized elevation and a quantized azimuth according to a second quantisation scheme; and selecting either the first quantization scheme or the second quantization scheme for quantising the elevation and the azimuth for all time frequency blocks of the sub band of the audio frame, wherein the selecting is dependent on the first and second distortion measures.

The first quantization scheme may comprise on a per time frequency block basis means for: quantizing the elevation by selecting a closest elevation value from a set of elevation values on a spherical grid, wherein each elevation value in the set of elevation values is mapped to a set of azimuth values on the spherical grid; and quantizing the azimuth by selecting a closest azimuth value from a set of azimuth values, where the set of azimuth values is dependent on the closest elevation value.

The number of elevation values in the set of elevation values may be dependent on a bit resolution factor for the sub frame, and wherein the number of azimuth values in the set of azimuth values may be mapped to each elevation value is also dependent on the bit resolution factor for the sub frame.

The second quantisation scheme may comprise means for: averaging the elevations of all time frequency blocks of the sub band of the audio frame to give an average elevation value; averaging the azimuths of all time frequency blocks of the sub band of the audio frame to give an average azimuth value; quantising the average value of elevation and the average value of azimuth; forming a mean removed azimuth vector for the audio frame, wherein each component of the mean removed azimuth vector comprises a mean removed azimuth component for a time frequency block wherein the mean removed azimuth component for the time frequency block is formed by subtracting the quantized average value of azimuth from the azimuth associated with the time frequency block; and vector quantising the mean removed azimuth vector for the frame by using a codebook.

The first distance measure may comprise a L2 norm distance between a point on a sphere given by the elevation and azimuth and a point on the sphere given by the quantized elevation and quantized azimuth according to the first quantization scheme.

The first distance measure may be given by $1-\cos\hat{\theta}_i\cos\theta_i\cos(\Delta\phi_i)-\sin\theta_i\sin\hat{\theta}_i$, wherein $\theta_i$ is the elevation for a time frequency block i, wherein $\hat{\theta}_i$ is the quantized elevation according to the first quantization scheme for the time frequency block i and wherein $\Delta\phi_i$ is an approximation of a distortion between the azimuth and the quantized azimuth according to the first quantisation scheme for the time frequency block i.

The approximation of the distortion between the azimuth and the quantized azimuth according to the first quantization scheme may be given as 180 degrees divided by $n_i$, wherein $n_i$ is the number of azimuth values in the set of azimuth values corresponding to the quantized elevation $\hat{\theta}_i$ according to the first quantization scheme for the time frequency block i.

The second distance measure may comprise a L2 norm distance between a point on a sphere given by the elevation and azimuth and a point on the sphere given by the quantized elevation and quantized azimuth according to the second quantization scheme.

The second distance measure may be given by $1-\cos\theta_{av}\cos\theta_i\cos(\Delta\phi_{CB}(i))-\sin\theta_i\sin\theta_{av}$, wherein $\theta_{av}$ is the quantized average elevation according to the second quantization scheme for the audio frame, $\theta_i$ is the elevation for a time frequency block i and $\Delta\phi_{CB}(i)$ is an approximation of the distortion between the azimuth and the azimuth component of the quantised mean removed azimuth vector according to the second quantization scheme for the time frequency block i.

The approximation of the distortion between the azimuth and the azimuth component of the quantised mean removed azimuth vector according to the second quantization scheme for the time frequency block i may be a value associated with the codebook.

According to a third aspect there is provided an apparatus comprising: an apparatus comprising at least one processor and at least one memory including computer program code, the at least one memory and the computer program code configured to, with the at least one processor, cause the apparatus to receive for each time frequency block of a sub band of an audio frame a spatial audio parameter comprising an azimuth and an elevation; determine a first distortion measure for the audio frame by determining a first distance measure for each time frequency block and summing the first distance measure for each time frequency block, wherein the first distance measure is an approximation of a distance between the elevation and azimuth and a quantized elevation a quantized azimuth according to a first quantisation scheme; determine a second distortion measure for the audio frame by determining a second distance measure for each time frequency block and summing the second distance measure for each time frequency block, wherein the second distance measure is an approximation of a distance between the elevation and azimuth and a quantized elevation and a quantized azimuth according to a second quantisation scheme; and select either the first quantization scheme or the second quantization scheme for quantising the elevation and the azimuth for all time frequency blocks of the sub band of the audio frame, wherein the selection is dependent on the first and second distortion measures.

The first quantization scheme may be caused by the apparatus, on a per time frequency block basis, by the apparatus being caused to: quantize the elevation by selecting a closest elevation value from a set of elevation values on a spherical grid, wherein each elevation value in the set of elevation values is mapped to a set of azimuth values on the spherical grid; and quantize the azimuth by selecting a closest azimuth value from a set of azimuth values, where the set of azimuth values is dependent on the closest elevation value.

The number of elevation values in the set of elevation values may be dependent on a bit resolution factor for the sub frame, and wherein the number of azimuth values in the set of azimuth values mapped to each elevation value may also be dependent on the bit resolution factor for the sub frame.

The second quantization scheme may be caused by the apparatus being caused to: average the elevations of all time frequency blocks of the sub band of the audio frame to give an average elevation value; average the azimuths of all time frequency blocks of the sub band of the audio frame to give an average azimuth value; quantise the average value of elevation and the average value of azimuth; form a mean removed azimuth vector for the audio frame, wherein each component of the mean removed azimuth vector comprises a mean removed azimuth component for a time frequency block wherein the mean removed azimuth component for the time frequency block is formed by subtracting the quantized average value of azimuth from the azimuth associated with the time frequency block; and vector quantise the mean removed azimuth vector for the frame by using a codebook.

The first distance measure may comprises an approximation of an L2 norm distance between a point on a sphere given by the elevation and azimuth and a point on the sphere given by the quantized elevation and quantized azimuth according to the first quantization scheme.

The first distance measure may be given by $1-\cos\hat{\theta}_i \cos\theta_i \cos(\Delta\phi_i)-\sin\theta_i \sin\hat{\theta}_i$, wherein $\theta_i$ is the elevation for a time frequency block i, wherein $\hat{\theta}_i$ is the quantized elevation according to the first quantization scheme for the time frequency block i and wherein $\Delta\phi_i$ is an approximation of a distortion between the azimuth and the quantized azimuth according to the first quantisation scheme for the time frequency block i.

The approximation of the distortion between the azimuth and the quantized azimuth according to the first quantization scheme may be given as 180 degrees divided by $n_i$, wherein $n_1$ is the number of azimuth values in the set of azimuth values corresponding to the quantized elevation $\hat{\theta}_i$ according to the first quantization scheme for the time frequency block i.

The second distance measure may comprise an L2 norm distance between a point on a sphere given by the elevation and azimuth and a point on the sphere given by the quantized elevation and quantized azimuth according to the second quantization scheme.

The second distance measure may be given by $1-\cos\theta_{av}\cos\theta_i\cos(\Delta\phi_{CB}(i))-\sin\theta_i\sin\theta_{av}$, wherein $\theta_{av}$ is the quantized average elevation according to the second quantization scheme for the audio frame, $\theta_i$ is the elevation for a time frequency block i and $\Delta\phi_{CB}(i)$ is an approximation of the distortion between the azimuth and the azimuth component of the quantised mean removed azimuth vector according to the second quantization scheme for the time frequency block i.

The approximation of the distortion between the azimuth and the azimuth component of the quantised mean removed azimuth vector according to the second quantization scheme for the time frequency block i may be a value associated with the codebook.

According to a fourth aspect there is provided a computer program comprising instructions [or a computer readable medium comprising program instructions] for causing an apparatus to receive for each time frequency block of a sub band of an audio frame a spatial audio parameter comprising an azimuth and an elevation; determine a first distortion measure for the audio frame by determining a first distance measure for each time frequency block and summing the first distance measure for each time frequency block, wherein the first distance measure is an approximation of a distance between the elevation and azimuth and a quantized elevation a quantized azimuth according to a first quantisation scheme; determining a second distortion measure for the audio frame by determine a second distance measure for each time frequency block and summing the second distance measure for each time frequency block, wherein the second distance measure is an approximation of a distance between the elevation and azimuth and a quantized elevation and a quantized azimuth according to a second quantisation scheme; and select either the first quantization scheme or the second quantization scheme for quantising the elevation and the azimuth for all time frequency blocks of the sub band of the audio frame, wherein the selecting is dependent on the first and second distortion measures.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore the output of the example system is a multi-channel loudspeaker arrangement. However it is understood that the output may be rendered to the user via means other than loudspeakers. Furthermore the multi-channel loudspeaker signals may be generalised to be two or more playback audio signals.

The metadata consists at least of elevation, azimuth and the energy ratio of a resulting direction, for each considered time/frequency subband. The direction parameter components, the azimuth and the elevation are extracted from the audio data and then quantized to a given quantization resolution. The resulting indexes must be further compressed for efficient transmission. For high bitrate, high quality lossless encoding of the metadata is needed.

The concept as discussed hereafter is to combine a fixed bitrate coding approach with variable bitrate coding that distributes encoding bits for data to be compressed between different segments, such that the overall bitrate per frame is fixed. Within the time frequency blocks, the bits can be transferred between frequency sub-bands.

Furthermore the concept discussed hereafter looks to exploit the variance of the direction parameter components in determining a quantization scheme for the azimuth and the elevation values. In other words the azimuth and elevation values can be quantized using one of a number of quantization schemes on a per sub band and sub frame basis. The selection of the particular quantization scheme can be made in accordance with a determining procedure which can be influenced by variance of said direction parameter components. The determining procedure uses a calculation of quantization error distance which is unique to each quantization scheme.

Figure 1:
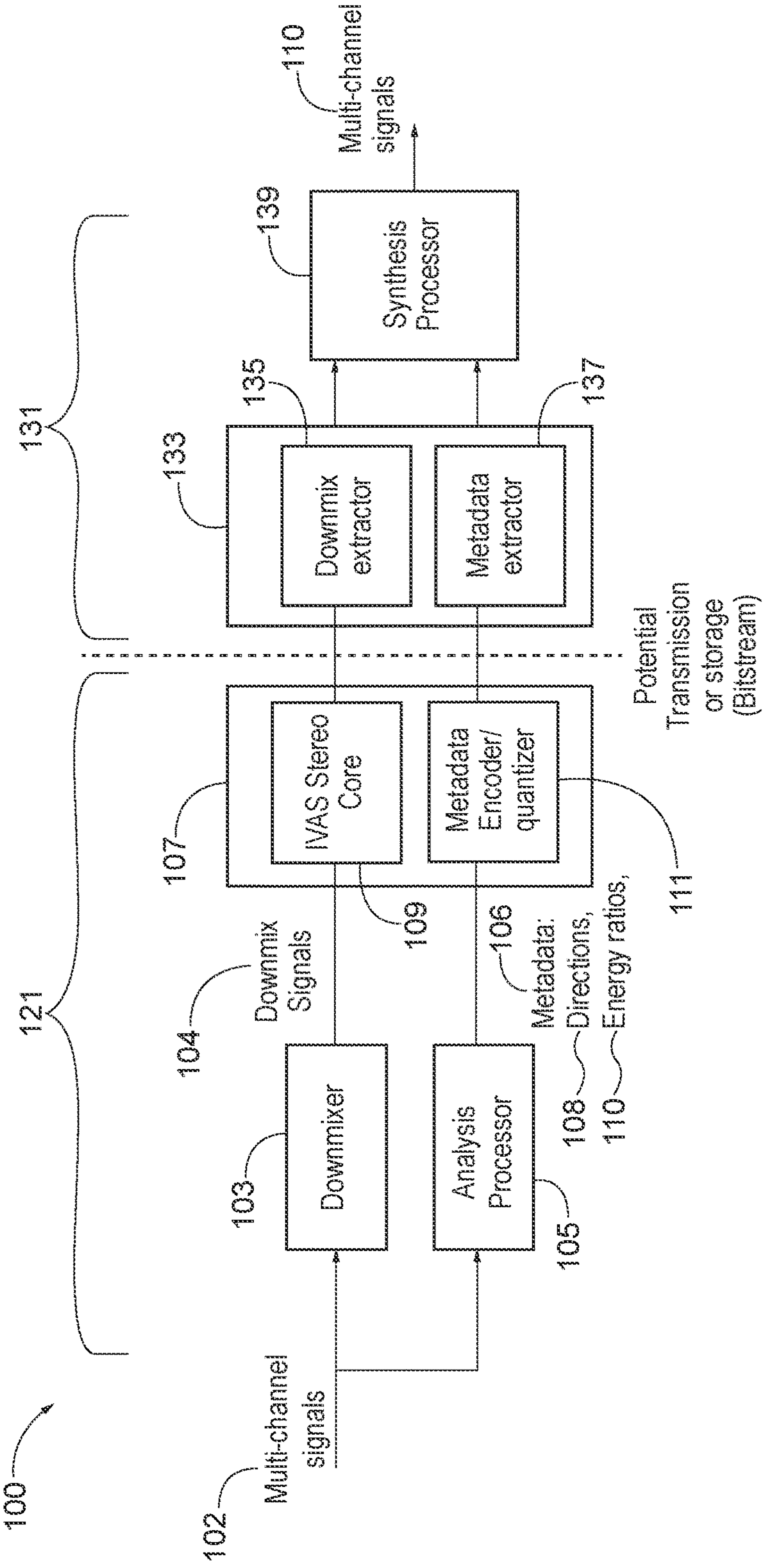
FIG. 1 shows schematically a system of apparatus suitable for implementing some embodiments.

With respect to FIG. 1 an example apparatus and system for implementing embodiments of the application are shown. The system 100 is shown with an 'analysis' part 121 and a 'synthesis' part 131. The 'analysis' part 121 is the part from receiving the multi-channel loudspeaker signals up to an encoding of the metadata and downmix signal and the 'synthesis' part 131 is the part from a decoding of the encoded metadata and downmix signal to the presentation of the re-generated signal (for example in multi-channel loudspeaker form).

The input to the system 100 and the 'analysis' part 121 is the multi-channel signals 102. In the following examples a microphone channel signal input is described, however any suitable input (or synthetic multi-channel) format may be implemented in other embodiments. For example in some embodiments the spatial analyser and the spatial analysis may be implemented external to the encoder. For example in some embodiments the spatial metadata associated with the audio signals may be a provided to an encoder as a separate bit-stream. In some embodiments the spatial metadata may be provided as a set of spatial (direction) index values.

The multi-channel signals are passed to a downmixer 103 and to an analysis processor 105.

In some embodiments the downmixer 103 is configured to receive the multi-channel signals and downmix the signals to a determined number of channels and output the downmix signals 104. For example the downmixer 103 may be configured to generate a 2 audio channel downmix of the multi-channel signals. The determined number of channels may be any suitable number of channels. In some embodiments the downmixer 103 is optional and the multi-channel signals are passed unprocessed to an encoder 107 in the same manner as the downmix signal are in this example.

In some embodiments the analysis processor 105 is also configured to receive the multi-channel signals and analyse the signals to produce metadata 106 associated with the multi-channel signals and thus associated with the downmix signals 104. The analysis processor 105 may be configured to generate the metadata which may comprise, for each time-frequency analysis interval, a direction parameter 108 and an energy ratio parameter 110 (and in some embodiments a coherence parameter, and a diffuseness parameter). The direction and energy ratio may in some embodiments be considered to be spatial audio parameters. In other words the spatial audio parameters comprise parameters which aim to characterize the sound-field created by the multi-channel signals (or two or more playback audio signals in general).

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The downmix signals 104 and the metadata 106 may be passed to an encoder 107.

The encoder 107 may comprise an audio encoder core 109 which is configured to receive the downmix (or otherwise) signals 104 and generate a suitable encoding of these audio signals. The encoder 107 can in some embodiments be a computer (running suitable software stored on memory and on at least one processor), or alternatively a specific device utilizing, for example, FPGAs or ASICs. The encoding may be implemented using any suitable scheme. The encoder 107 may furthermore comprise a metadata encoder/quantizer 111 which is configured to receive the metadata and output an encoded or compressed form of the information. In some embodiments the encoder 107 may further interleave, multiplex to a single data stream or embed the metadata within encoded downmix signals before transmission or storage shown in FIG. 1 by the dashed line. The multiplexing may be implemented using any suitable scheme.

In the decoder side, the received or retrieved data (stream) may be received by a decoder/demultiplexer 133. The decoder/demultiplexer 133 may demultiplex the encoded streams and pass the audio encoded stream to a downmix extractor 135 which is configured to decode the audio signals to obtain the downmix signals. Similarly the decoder/demultiplexer 133 may comprise a metadata extractor 137 which is configured to receive the encoded metadata and generate metadata. The decoder/demultiplexer 133 can in some embodiments be a computer (running suitable software stored on memory and on at least one processor), or alternatively a specific device utilizing, for example, FPGAs or ASICs.

The decoded metadata and downmix audio signals may be passed to a synthesis processor 139.

The system 100 'synthesis' part 131 further shows a synthesis processor 139 configured to receive the downmix and the metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the downmix signals and the metadata.

Therefore in summary first the system (analysis part) is configured to receive multi-channel audio signals.

Then the system (analysis part) is configured to generate a downmix or otherwise generate a suitable transport audio signal (for example by selecting some of the audio signal channels).

The system is then configured to encode for storage/transmission the downmix (or more generally the transport) signal.

After this the system may store/transmit the encoded downmix and metadata.

The system may retrieve/receive the encoded downmix and metadata. The system may then be configured to extract the downmix and metadata from encoded downmix and metadata parameters, for example demultiplex and decode the encoded downmix and metadata parameters.

The system (synthesis part) is configured to synthesize an output multi-channel audio signal based on extracted downmix of multi-channel audio signals and metadata.

Figure 2:
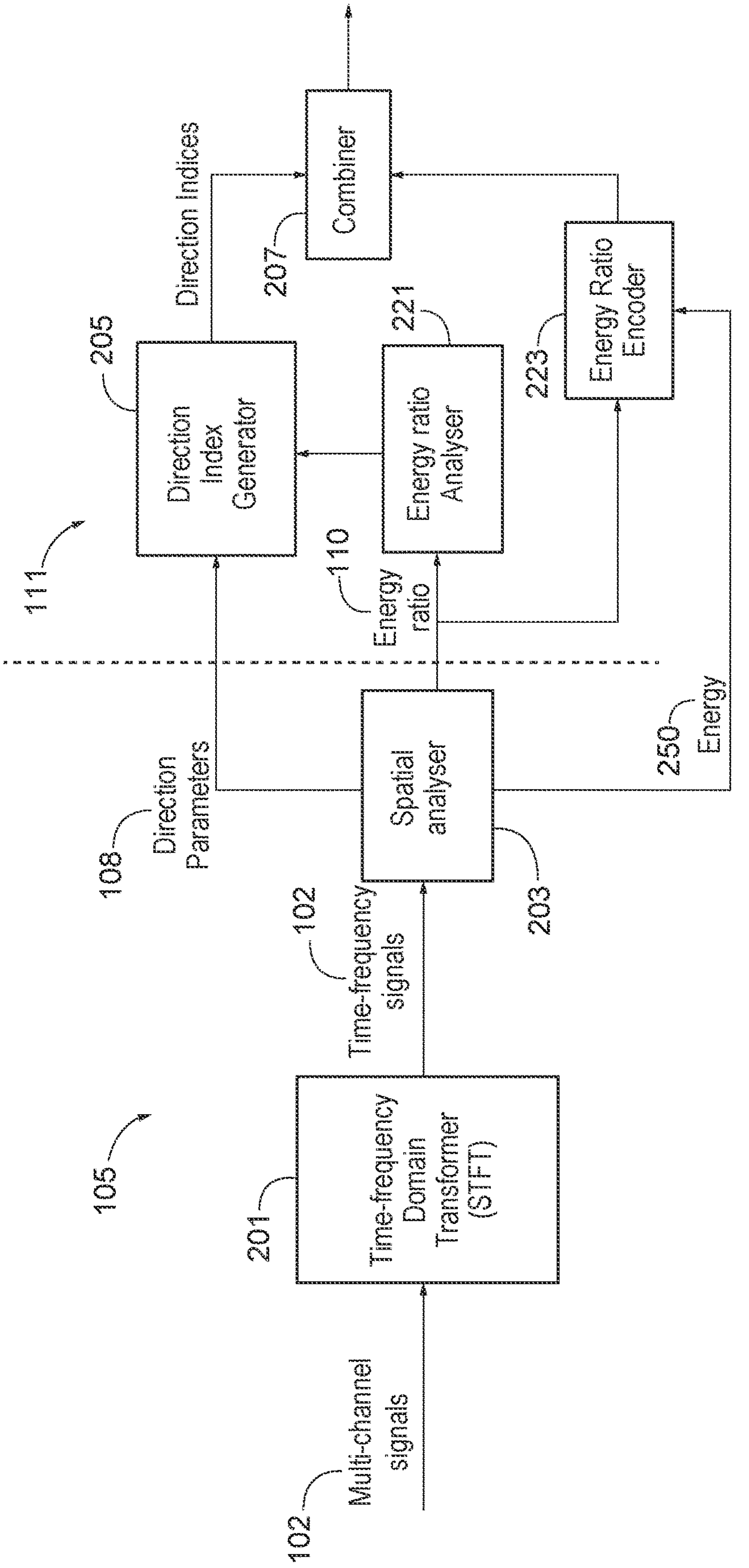
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203 and to a signal analyser 205.

Thus for example the time-frequency signals 202 may be represented in the time-frequency domain representation by $$s_i(b,n),$$

where b is the frequency bin index and n is the time-frequency block (frame) index and i is the channel index. In another expression, n can be considered as a time index with a lower sampling rate than that of the original time-domain signals. These frequency bins can be grouped into subbands that group one or more of the bins into a subband of a band index k=0, . . . , K−1. Each subband k has a lowest bin $b_{k,low}$ and a highest bin $b_{k,high}$, and the subband contains all bins from $b_{k,low}$ to $b_{k,high}$. The widths of the subbands can approximate any suitable distribution. For example the Equivalent rectangular bandwidth (ERB) scale or the Bark scale.

In some embodiments the analysis processor 105 comprises a spatial analyser 203. The spatial analyser 203 may be configured to receive the time-frequency signals 202 and based on these signals estimate direction parameters 108. The direction parameters may be determined based on any audio based 'direction' determination.

For example in some embodiments the spatial analyser 203 is configured to estimate the direction with two or more signal inputs. This represents the simplest configuration to estimate a 'direction', more complex processing may be performed with even more signals.

The spatial analyser 203 may thus be configured to provide at least one azimuth and elevation for each frequency band and temporal time-frequency block within a frame of an audio signal, denoted as azimuth φ(k,n) and elevation θ(k,n). The direction parameters 108 may be also be passed to a direction index generator 205.

The spatial analyser 203 may also be configured to determine an energy ratio parameter 110. The energy ratio may be considered to be a determination of the energy of the audio signal which can be considered to arrive from a direction. The direct-to-total energy ratio r(k,n) can be estimated, e.g., using a stability measure of the directional estimate, or using any correlation measure, or any other suitable method to obtain a ratio parameter. The energy ratio may be passed to an energy ratio analyser 221 and an energy ratio combiner 223.

Therefore in summary the analysis processor is configured to receive time domain multichannel or other format such as microphone or ambisonics audio signals.

Following this the analysis processor may apply a time domain to frequency domain transform (e.g. STFT) to generate suitable time-frequency domain signals for analysis and then apply direction analysis to determine direction and energy ratio parameters.

The analysis processor may then be configured to output the determined parameters.

Although directions and ratios are here expressed for each time index n, in some embodiments the parameters may be combined over several time indices. Same applies for the frequency axis, as has been expressed, the direction of several frequency bins b could be expressed by one direction parameter in band k consisting of several frequency bins b. The same applies for all of the discussed spatial parameters herein.

As also shown in FIG. 2 an example metadata encoder/quantizer 111 is shown according to some embodiments.

The metadata encoder/quantizer 111 may comprise an energy ratio analyser (or quantization resolution determiner) 221. The energy ratio analyser 221 may be configured to receive the energy ratios and from the analysis generate a quantization resolution for the direction parameters (in other words a quantization resolution for elevation and azimuth values) for all of the time-frequency (TF) blocks in the frame. This bit allocation may for example be defined by bits_dir0[0:N−1][0:M−1], where N=number of subbands and M=number of time frequency (TF) blocks in a subband. In other words the array bits_dir0 may be populated for each time frequency block of the current frame with a value of predefined number of bits (i.e. quantization resolution values.) The particular value of predefined number of bits for each time frequency block can be selected from a set of predefined values in accordance with the energy ratio of the particular time frequency block. For instance a particular energy ratio value for a time frequency (TF) block can determine the initial bit allocation for the time frequency (TF) block.

It is to be noted that a TF block can be referred to as sub frame in time within 1 of the N subbands For example in some embodiments the above energy ratio for each time frequency block may be quantized as 3 bits using a scalar non-uniform quantizer. The bits for direction parameters (azimuth and elevation) are allocated according to the table bits_direction[ ]; if the energy ratio has the quantization index i, the number of bits for the direction is bits_direction[i].

```
const short bits_direction[ ] = {
11, 11,10, 9, 8, 6, 5, 3};
```

In other words each entry of bits_dir0[0:N−1][0:M−1] can be populated initially by a value from the bits_direction[ ] table.

The metadata encoder/quantizer 111 may comprise a direction index generator 205. The direction index generator 205 is configured to receive the direction parameters (such as the azimuth φ(k, n) and elevation θ(k, n)) 108 and the quantization bit allocation and from this generate a quantized output in the form of indexes to various tables and codebooks which represent the quantized direction parameters.

Figure 3:
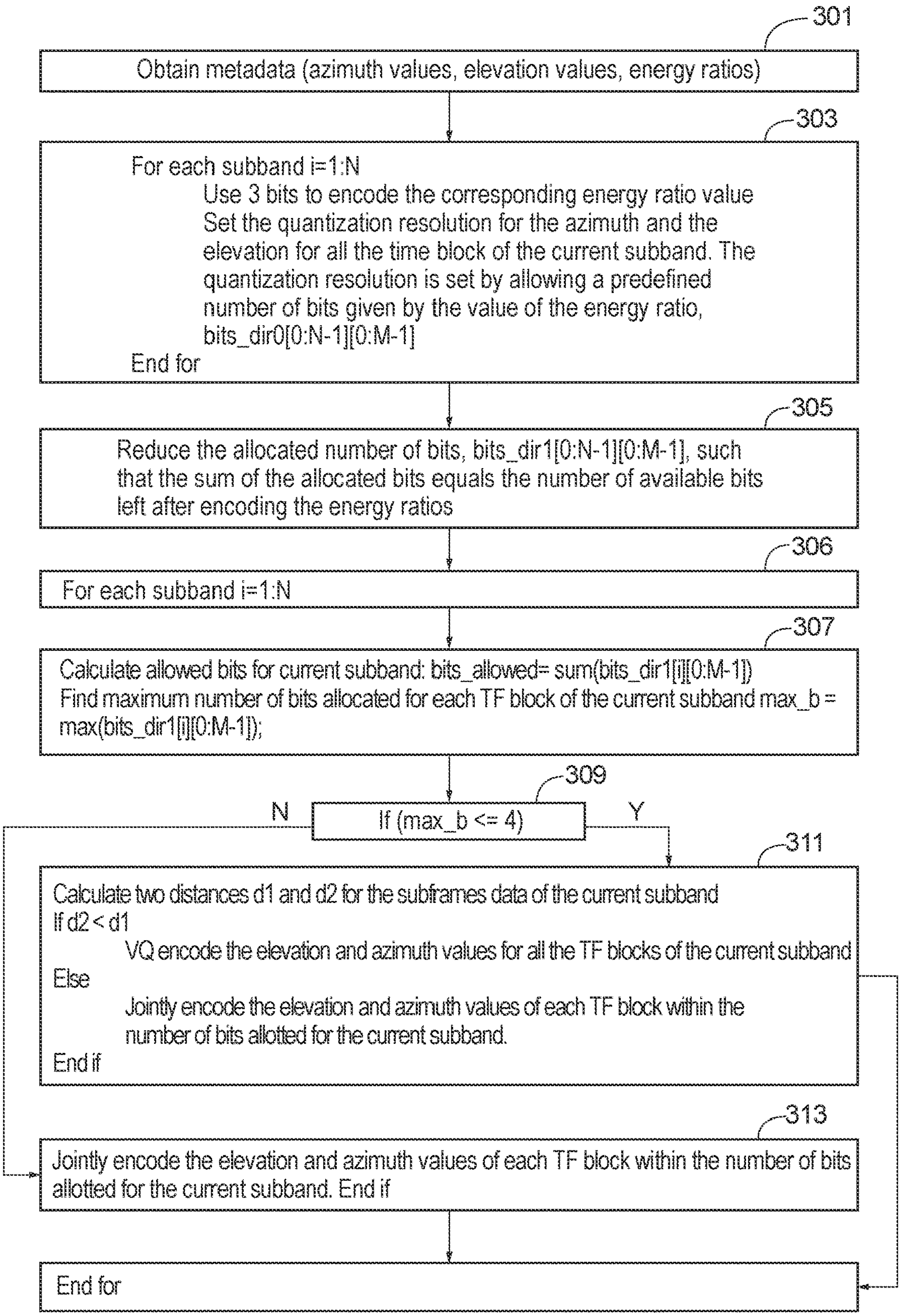
FIG. 3 show a flow diagram of the operation of the metadata encoder as shown in FIG. 2 according to some embodiments.

Some of the operational steps performed by the metadata encoder/quantizer 111 are shown in FIG. 3. These steps can constitute an algorithmic process in relation to the quantizing of the direction parameters.

Initially the step of obtaining the directional parameters (azimuth and elevation) 108 from the spatial analyser 203 is shown as the processing step 301.

The above steps of preparing the initial distribution or allocation of bits for each sub band in the form of the array bits_dir0[0:N−1][0:M−1], where N=number of subbands and M=number of time frequency blocks in a subband is shown as 303 in FIG. 3.

Initially the direction index generator 205 may be configured to reduce the allocated number of bits, to bits_dir1[0:N−1][0:M−1], such that the sum of the allocated bits equals the number of available bits left after encoding the energy ratios. The reduction of the number of initially allocated bits, in other words bits_dir1[0:N−1][0:M−1] from bits_dir0[0:N−1][0:M−1] may be implemented in some embodiments by:

Firstly uniformly diminishing the number of bits across time-frequency (TF) block with an amount of bits given by the integer division between the bits to be reduced and the number of time-frequency blocks;

Secondly, the bits that still need to be subtracted are subtracted one per time-frequency block starting with subband 0, time-frequency block 0.

This may be implemented for example by the following C code:

```
void
only__reduce__bits__direction(short
bits__dir0[MASA__MAXIMUM__CODING__SUBBANDS][MASA__SUBFRAMES],
   short max__bits, short reduce__bits, short coding__subbands, short
no__subframes, IVAS__MASA__QDIRECTION * qdirection)
{
   /* does not update the q direction structure */
   int j, k, bits = 0, red__times, rem, n = 0;
   short delta = 1, max__nb = 0;
   /* keep original allocation */
   for (j = 0; j < coding__subbands; j++)
   {
      for (k = 0; k < no__subframes; k++)
      {
         qdirection->bits__sph__idx[j][k] = bits__dir0[j][k];
      }
   }
   if (reduce__bits > 0)
   {
      red__times = reduce__bits / (coding__subbands*no__subframes); /*
number of complete reductions by 1 bit */
      for (j = 0; j < coding__subbands; j++)
      {
         for (k = 0; k < no__subframes; k++)
         {
            bits__dir0[j][k] -= red__times;
            reduce__bits -= red__times;
            if (bits__dir0[j][k] < MIN__BITS__TF)
            {
               reduce__bits += MIN__BITS__TF-bits__dir0[j][k];
               bits__dir0[j][k] = MIN__BITS__TF;
            }
         }
      }
      rem = reduce__bits;
      n=0;
      while(n<rem)
      {
         max__nb = 0;
         for (j = 0; j < coding__subbands; j++)
         {
            for (k = 0; k < no__subframes; k++)
            {
               if ((n < rem) && (bits__dir0[j][k] >
MIN__BITS__TF-delta))
               {
                  bits__dir0[j][k] -= 1;
                  n++;
               }
               if (max__nb < bits__dir0[j][k])
               {
                  max__nb = bits__dir0[j][k];
               }
            }
         }
         if (max__nb <= MIN__BITS__TF)
```

-continued

```
        {
          delta += 1;
        }
      }
    }
  return;
}
```

The value MIN_BITS_TF is the minimum accepted value for the bit allocation for a TF block if there is the total number of bits allows. In some embodiments, a minimum number of bits, larger than 0, may be imposed for each block.

The direction index generator 205 may then be configured to implement the reduced number of bits allowed for quantizing the direction components on a sub-band by sub-band basis from i=1 to N−1.

With reference to FIG. 3 the step of reducing the initial allocation of bits for quantizing the direction components on a per sub band basis: bits_dir1[0:N−1][0:M−1] (the sum of the allocated bits=number of available bits left after encoding the energy ratios) as shown in FIG. 3 by step 305.

In some embodiments the quantization is based on an arrangement of spheres forming a spherical grid arranged in rings on a 'surface' sphere which are defined by a look up table defined by the determined quantization resolution. In other words the spherical grid uses the idea of covering a sphere with smaller spheres and considering the centres of the smaller spheres as points defining a grid of almost equidistant directions. The smaller spheres therefore define cones or solid angles about the centre point which can be indexed according to any suitable indexing algorithm. Although spherical quantization is described here any suitable quantization, linear or non-linear may be used.

As mentioned above the bits for the direction parameters (azimuth and elevation) can be allocated according to the table bits_direction[ ]. Consequently, the resolution of the spherical grid can also be determined by the energy ratio and the quantization index i of the quantized energy ratio. To this end the resolution of the spherical grid according to different bit resolutions may be given by the following tables:

```
const short no_theta[ ] = /* from 1 to 11 bits */
{/*1,                  - 1 bit
1,*/                   /* 2 bits */
1,                     /* 3 bits */
2,                     /* 4 bits */
4,                     /* 5 bits */
5,                     /* 6 bits */
6,                     /* 7 bits */
7,                     /* 8 bits */
10,                    /* 9 bits */
14,                    /* 10 bits */
19                     /* 11 bits */
};
```

```
const short no_phi[ ][MAX_NO_THETA] = /* from 1 to 11 bits*/
{
{2},
{4},
{4,2}, /* no points at poles */
{8,4}, /* no points at poles */
{12,7,2,1},
{14,13,9,2,1},
{22,21,17, 11,3,1},
```

-continued

```
{33,32,29,23,17,9,1},
{48,47,45,41,35,28,20,12,2,1},
{60,60,58,56,54,50,46,41,36,30,23,17,10,1},
{89,89,88,86,84,81,77,73,68,63,57,51,44,38,30,23,15,8,1}
};
```

The array or table no_theta specifies the number of elevation values which are evenly distributed in the 'North hemisphere' of the sphere, including the Equator. The pattern of elevation values distributed in the 'North hemisphere' is repeated for the corresponding 'South hemisphere' points. For example an energy ratio index i=2 results in an allocation of 5 bits for the direction parameters. From the table/array no_theta 4 elevation values are given which correspond to the four evenly distributed 'northern hemisphere' values [0, 30, 60, 90] this also corresponds to 4−1=3 negative elevation values (in degrees) [−30, −60, −90]. The array/table no_phi specifies the number of azimuth points for each value of elevation in the no_theta array. From the above example of an energy ratio index of 6, the first elevation value, 0, maps to 12 equidistant azimuth values as given by the fifth row entry in the array no_phi, and for the elevation values 30 and −30 maps to 7 equidistant azimuth values as given by the same row entry in the array phi_no. This mapping pattern is repeated to each value of elevation.

For all quantization resolutions the distribution of elevation values in the 'northern hemisphere' is broadly given by 90 degrees divided by the number of elevation values 'no_theta'. A similar rule is also applied to elevation values below the 'equator' so to speak in order to provide the distribution of values in the 'southern hemisphere'. Similarly a spherical grid for 4 bits can have elevation points of [0, 45] above the equator and a single elevation point of [−45] degrees below the equator. Again from the no_phi table there are 8 equidistance azimuth values for the first elevation value [0] and 4 equidistance azimuth values for the elevation values [45] and [−45]

The above provide an example of how the spherical quantization grid is represented, it is to be appreciated that other suitable distributions may be implemented. For example a spherical grid for 4 bits may only have points [0, 45] above the equator and no points below the equator. Similarly the 3 bits distribution may be spread on the sphere or restricted to the Equator only.

It is to be noted in the above described quantisation scheme that the determined quantised elevation value determines the particular set of azimuth values from which the eventual quantised azimuth value is chosen. Therefore the above quantisation scheme may be termed below in the description as the joint quantization of the pair of elevation and azimuth values.

The direction index quantizer 205 may be configured to perform the following steps in quantizing the direction components (elevation and azimuth) for each sub band from i=1 to N−1.

a. Initially, the direction index generator 205 may be configured to determine based on a calculated number of allowed bits for the current sub-band. In other words bits_allowed=sum (bits_dir1[i][0:M−1]).

b. Following this the direction index generator 205 may be configured to determine the maximum number of bits allocated to a time frequency block of all M time frequency blocks for the current subband. This may be represented as the following pseudo code statement max_b=max(bits_dir1[i][0:M−1].

With reference to FIG. 3 the steps a and b are depicted as the processing step 307.

c. Upon determination of max_b, the direction index generator 205 then makes a decision as to whether it will either jointly encode the elevation and azimuth values for each time frequency block within the number of bits allotted for the current subband or whether to perform the encoding of the elevation and azimuth values based on a further conditional test.

With reference to FIG. 3 the above decision step in relation to max_b is shown as the processing step 309.

The further conditional test may be based on a distance measure based approach. From a pseudo code perspective this step may be expressed as

```
If (max_b <= 4)
  i.   Calculate two distances d1 and d2 for the subframes data of the
       current subband
  ii.  If d2 < d1
           VQ encode the elevation and azimuth values for all the TF
           blocks of the current subband
  iii. Else
           Jointly encode the elevation and azimuth values of each TF
           block within the number of bits allotted for the current subband.
  iv.  End if
```

From the above pseudo code it can be seen that initially max_b, maximum number of bits allocated to a time frequency block in a frame, is checked in order to determine if it falls below a predetermined value. In the above pseudo code this value is set at 4 bits, however it is to be appreciated that the above algorithm can be configured to accommodate other predetermined values. Upon determining whether max_b meets the threshold condition the direction index generator 205 then goes onto calculate two separate distance measures d1 and d2. The value of each distance measure d1 and d2 can be used to determine whether the direction components (elevation and azimuth) are quantised either according to the above described joint quantisation scheme using tables such as no_theta and no_phi as described in the example above or according to a vector quantized based approach. The joint quantisation scheme quantises each pair of elevation and azimuth values jointly as a pair on a per time block basis. However, the vector quantisation approach looks to quantize the elevation and azimuth value across all time blocks of the frame giving a quantized elevation value for all time blocks of the frame and a quantized n dimensional vector where each component corresponds to a quantised representation of an azimuth value of a particular time block of the frame.

As mentioned above the direction components (elevation and azimuth) can use a spherical grid configuration to quantize the respective components. Consequently, in embodiments the distance measure d1 and d2 can both be based on the L2 norm between two points on the surface of a unitary sphere, where one of the points is the quantized direction value having the quantised elevation and azimuth components $\hat{\theta}, \hat{\varnothing}$ and the other point being the unquantised direction value having unquantised elevation and azimuth components $\theta, \varnothing$.

The distance d1 is given by the equation below where it can be seen that the distance measure is given by the sum of the L2 norms across the time frequency blocks M in the current frame, with each L2 norm being a measure of distance between two points on the spherical grid for each time frequency block. The first point being the unquantised azimuth and elevation value for a time frequency block and the second point being the quantised azimuth and elevation value for the time frequency block.

$$d_1 = \sum_{i=1}^{M} 1 - \cos\hat{\theta}_i \cos\theta_i \cos(\Delta\phi(\hat{\theta}_i, n_i)) - \sin\theta_i \sin\hat{\theta}_i$$

For each time frequency block i the distortion $1-\cos\hat{\theta}_i \cos\theta_i \cos(\Delta\phi(\hat{\theta}_i, n_i)) - \sin\theta_i \sin\hat{\theta}_i$ can be determined by initially quantizing the elevation value θ to the nearest elevation value by using the table no_theta to determine how many evenly distributed elevation values populate the northern and southern hemisphere of the spherical grid. For instance if max_b is determined to be 4 bits then no_theta indicates that there are three possible values for the elevation comprising 0 and +/−45 degrees. So in this example elevation value θ for the time block will be quantised to one of the values 0 and +/−45 degrees to give $\hat{\theta}_i$.

From the above description relating to the quantization of the elevation and azimuth values with the tables no_theta and no_phi it is to be appreciated that the elevation and azimuth values can be quantised according to these tables. The distortion as a result of quantizing the azimuth value is given as $\cos(\Delta\phi(\hat{\theta}_i, n_i))$ in the above expression, where it can be seen that phi (ϕ) is a function of the quantized theta 6, and the number of evenly distributed azimuth values $n_1$. For instance using the above example, if quantized theta $\hat{\theta}_i$ is determined to be 0 degrees, then from the no_phi table it can be seen that there are eight possible azimuth quantisation points to which the azimuth value can be quantised.

In order to simplify the above distortion relating to the quantized azimuth value, that is $\cos(\Delta\phi(\hat{\theta}_i, n_i))$, the angle $\Delta\phi(\hat{\theta}_i, n_i)$ is approximated as 180/n degrees, i.e. half the distance between two consecutive points. So returning to the above example the azimuth distortion relating to the time block whose quantised elevation value $\hat{\theta}_i$ is determined to be 0 degrees can be approximated as 180/8 degrees.

Therefore the overall value of distortion measure $d_1$ for the current frame is given as the sum of $1-\cos\hat{\theta}_i \cos\theta_i \cos(\Delta\phi(\hat{\theta}_i, n_i)) - \sin\theta_i \sin\hat{\theta}_i$ for each time frequency block 1 to M in the current frame. In other words the distortion measure d1 reflects a measure of quantization distortion resulting from quantising the direction components for the time blocks of a frame according to the above joint quantisation scheme in which the elevation and azimuth values are quantised as a pair on a per time frequency block basis.

The distance measure d2 over the TF blocks 1 to M of a frame can be expressed as $d_2=\Sigma_{i=1}^{M} 1-\cos\theta_{av} \cos\theta_i \cos(\Delta\phi_{CB}(\Sigma_{j=1} n_j - N_{av} - 1)) - \sin\theta_i \sin\theta_{av}$.

$$d_2 = \sum_{i=1}^{M} 1 - \cos\theta_{av}\cos\theta_i\cos(\Delta\phi_{CB}(\Sigma_{j=1} n_j - N_{av} - 1)) - \sin\theta_i \sin\theta_{av}$$

In essence d2 reflects the quantization distortion measure as a result of vector quantizing the elevation and azimuth values over the time frequency blocks of a frame. In effect the quantization distortion measure of representing the elevation and azimuth values for a frame as a single vector.

In embodiments the vector quantization approach can take the following form for each frame.

1. (a) Initially the average of the elevation values for all TF blocks 1 to M for the frame is calculated.

(b) The average of the azimuth values for all the TF blocks 1 to M is also calculated. In embodiments the calculation of the average azimuth value may be performed according to the following C code in order to avoid instances of the type where a "conventional" average of two angles of 270 degrees and 30 degrees would be 150 degrees, however a better physical representation of the average would be 330 degrees.

The calculation of the azimuth average value, for 4 TF blocks can be performed according to:

```
static float average_azimuth4(float *azimuth, short len, float * dist)
{
   /* takes 2 by 2 */
   float av_azi[3], d0;
   av_azi[0] = average_azimuth(azimuth, 2, dist);
   av_azi[1] = average_azimuth(&azimuth[2], 2, dist);
   av_azi[2] = average_azimuth(av_azi, 2, dist);
   d0 = distance2average(azimuth, av_azi[2], dist, len);
   return av_azi[2];
}
float average_azimuth(float *azimuth, short len, float * dist)
{
/* average of two azimuth values, taken such that the resulting average is
"physically" (on the circle) between the two input values */
   float av_azi, av_azi1, dist1[MASA_SUBFRAMES];
   float d0, d1;
   av_azi = mean(azimuth, len);
   if (av_azi >= 0)
   {
     av_azi1 = av_azi - 180;
   }
   else
   {
     av_azil = av_azi + 180;
   }
   d0 = distance2average(azimuth, av_azi, dist, len);
   d1 = distance2average(azimuth, av_azi1, dist1, len);
   if (d1<d0)
   {
     av_azi = av_azi1;
     mvr2r(dist1, dist, len); /* the distances are passed to be re-
used at the difference to average calculation */
   }
   return av_azi;
}
float distance2average(float * azimuth, float av_azi, float * dist, short
len)
{
/* difference in absolute value of an array of azimuth values with respect
to one average value, av_azi */
   short i;
   float d = 0.0f, d_i;
   for (i=0;i<len;i++)
   {
     d_i = azimuth[i] - av_azi;
     if (d_i < -180)
     {
       d_i = 360+d_i;
     }
     else if (d_i > 180)
     {
       d_i = -360+d_i;
     }
```

-continued

```
     dist[i] = d_i;
     d += abs(d_i);
   }
   return d;
}
```

2. The second step of the vector quantization approach is to determine if the number of bits allocated to each TF block is below a predetermined value, in this instance 3 bits when the max_b threshold is set to 4 bits. If the number of bits allocated to each TF block is below the threshold then both the average elevation value and average azimuth value are quantized according to the tables no_theta and no_phi as previously explained in connection with reference to the d1 distance measure.

3. However, if the number of bits allocated to each TF block is above the predetermined value then the quantisation of the elevation and azimuth values for the M TF blocks of the frame may take a different form. The form may comprise initially quantizing the average elevation and azimuth values as before. However with a greater number of bits, than before for example 7 bits. Then the mean removed azimuth vector is found for the frame by finding the difference between the azimuth value corresponding to each TF block and the quantised average azimuth value for the frame. The number of components of mean removed azimuth vector correspond to the number of TF blocks in the frame, in other words the mean removed azimuth vector is of dimension M with each components being a mean removed azimuth value of a TF block. In embodiments the mean removed azimuth vector may then be quantised by the means of a trained VQ codebook from a plurality of VQ codebooks. As alluded to earlier the bits available for quantising the direction components (azimuth and elevation) can vary from one frame to the next. Consequently there may be a plurality of VQ codebooks, in which each VQ codebook has a different number of vectors in accordance with the "bit size" of the codebook.

The distortion measure d2 for the frame may now be determined in accordance with the above equation. Where $\theta_{av}$ is the average value of the elevation values for the TF blocks for the current sub band, $N_{av}$ is the number of bits that would be used to quantize the average direction using the method according to the no_theta and no_phi tables. $\Delta\phi_{CB}(\Sigma_{j=1}n_j-N_{av})$ are the mean removed azimuth vectors, from the trained mean removed azimuth VQ codebooks, for the corresponding number of bits, $\Sigma_{j=1}n_j-N_{av}-1$ (total number of bits for the current subband minus bits for average direction, minus 1 bit to signal between joint and vector quantization). That is for each possible combination of bits as given by $\Sigma_{j=1}n_j-N_{av}-1$ there is a trained VQ codebook, which is searched in turn to provide the optimal mean difference azimuth vector. In embodiments the azimuth distortion $\Delta\phi_{CB}(\Sigma_{j=1}n_j-N_{av}-1)$ is approximated by having a predetermined distortion value for each codebook. Typically this value can be obtained during the process of training the codebook, in other words it may be the average error obtained when the codebook is trained using a database of training vectors.

With reference to FIG. 3 the above processing steps relating to the calculation of the distance measures d1 and d2 and the associate quantizing of the direction parameters in accordance with the value of d1 and d2 is shown as processing step 311. To be clear these processing steps include the quantizing of the direction parameters, and the quantizing is selected to be either joint quantization or vector quantization for TF blocks in the current frame.

It is to be appreciated that in order to select between the described joint encoding scheme or the described VQ encoding scheme for the quantisation of the M direction components (elevation and azimuth values) within the sub band the quantisation scheme of 311 FIG. 3 calculates the distance measures d1 and d2 in order to select between the said encoding schemes. However the distance measures d1 and d2 do not rely on fully determining the quantised direction components in order to determine their particular values. In particular the term in d1 and d2 associated with the difference between a quantised azimuth value and original azimuth value (i.e. for d1 $\Delta\phi(\hat{\theta}_i, n_i)$ and d2 $\Delta\phi_{CB}$) an approximation of the azimuth distortion is used. It is to be appreciated that an approximation is used in order to circumvent the need to perform a full quantization search for the azimuth value in order to determine whether the joint quantisation scheme or the VQ quantisation scheme is used. In the case of d1 the approximation to the calculation of $\Delta\phi$ circumvents the need to calculate $\Delta\phi$ for each value of azimuth mapped to the quantised value of theta. In the case of d2 the approximation to the calculation $\Delta\phi_{CB}$ circumvents the need to calculate the azimuth difference for each codebook entry of the VQ codebook.

In relation to the conditional processing step 309 in which the variable max_b is tested against a predetermined threshold value (FIG. 3 depicts an example value of 4 bits). It can be seen that if the condition in relation to the predetermined threshold is not met then the direction index generator 205 is directed to encode the elevation and azimuth values using the joint quantisation scheme, as previously described. This step is shown as processing step 313.

Also shown in FIG. 3 is the step 315 which is the corollary of step 306. These steps indicate that the processing steps 307 to 313 are performed on a per sub band basis.

For completeness the algorithm as depicted by FIG. 3 can be represented by the pseudo code below, where it can be seen that the inner loops of the pseudo code contain the processing step 311.

```
Encoding of directional data:
1.  For each subband i=1:N
    a.  Use 3 bits to encode the corresponding energy ratio value
    b.  Set the quantization resolution for the azimuth and the elevation for all the
        time block of the current subband. The quantization resolution is set by
        allowing a predefined number of bits given by the value of the energy ratio,
        bits_dir0[0:N−1][0:M−1]
2.  End for
3.  Reduce the allocated number of bits, bits_dir1[0:N−1][0:M−1], such that the sum of the
    allocated bits equals the number of available bits left after encoding the energy ratios
4.  For each subband i=1:N
    a.  Calculate allowed bits for current subband: bits_allowed=
        sum(bits_dir1[i][0:M−1])
    b.  Find maximum number of bits allocated for each TF block of the current
        subband max_b = max(bits_dir1[i][0:M−1]);
    c.  If (max_b <= 4)
        i.   Calculate two distances d1 and d2 for the subframes data of the
             current subband
        ii.  If d2 < d1
             1.  VQ encode the elevation and azimuth values for all the TF
                 blocks of the current subband
        iii. Else
             1.  Jointly encode the elevation and azimuth values of each TF
                 block within the number of bits allotted for the current subband.
        iv.  End if
    d.  Else
        i.   Jointly encode the elevation and azimuth values of each TF block
             within the number of bits allotted for the current subband.
    e.  End if
5.  End for
```

Having quantised all the direction components for the sub bands 1:N the quantization indices of the quantised direction components may be passed may then be passed to a combiner 207.

In some embodiments the encoder comprises an energy ratio encoder 223. The energy ratio encoder 223 may be configured to receive the determined energy ratios (for example direct-to-total energy ratios, and furthermore diffuse-to-total energy ratios and remainder-to-total energy ratios) and encode/quantize these.

For example in some embodiments the energy ratio encoder 223 is configured to apply a scalar non-uniform quantization using 3 bits for each sub-band.

Furthermore in some embodiments the energy ratio encoder 223 is configured to generate one weighted average value per subband. In some embodiments this average is computed by taking into account the total energy of each time-frequency block and the weighting applied based on the subbands having more energy.

The energy ratio encoder 223 may then pass this to the combiner which is configured to combine the metadata and output a combined encoded metadata.

Figure 4:
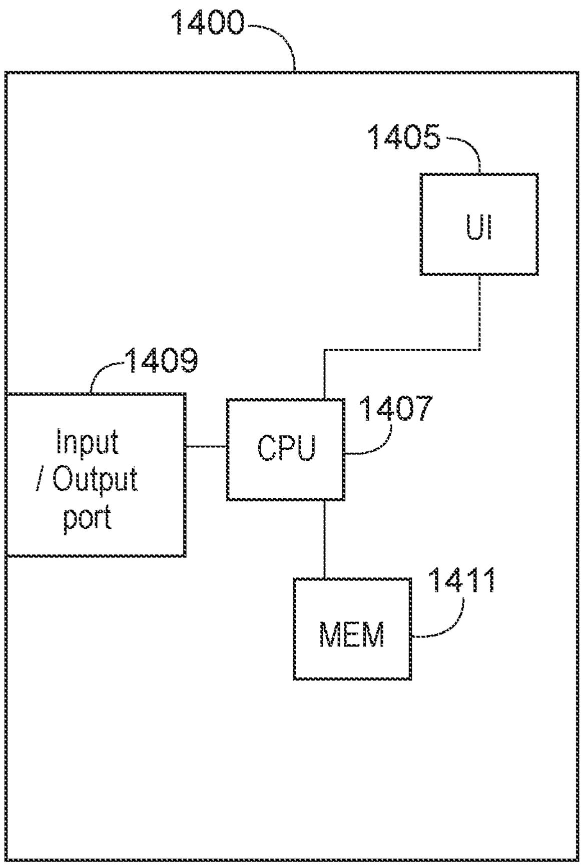
FIG. 4 shows schematically the metadata decoder according to some embodiments.

With respect to FIG. 4 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus to:

- provide for each time frequency block of a sub band of an audio frame a spatial audio parameter comprising an azimuth and an elevation;
- determine a first distortion measure for the audio frame by determining a first distance measure for each time frequency block and summing the first distance measure for each time frequency block, wherein the first distance measure is an approximation of a distance between the elevation and azimuth and a quantized elevation a quantized azimuth according to a first quantisation scheme;
- determine a second distortion measure for the audio frame by determining a second distance measure, according to a second quantisation scheme, for each time frequency block and summing the second distance measure for each time frequency block, wherein for the second quantisation scheme the apparatus is caused to:
  - average the elevations of all time frequency blocks of the sub band of the audio frame to give an average elevation value;
  - average the azimuths of all time frequency blocks of the sub band of the audio frame to give an average azimuth value;
  - quantise the average value of elevation and the average value of azimuth;
  - form a mean removed azimuth vector for the audio frame, wherein each component of the mean removed azimuth vector comprises a mean removed azimuth component for a time frequency block wherein the mean removed azimuth component for the time frequency block is formed by subtracting the quantized average value of azimuth from the azimuth associated with the time frequency block; and
  - vector quantise the mean removed azimuth vector for the frame by using a codebook, and wherein the second distance measure is given by $1-\cos\theta_{av}\cos\theta_i\cos(\Delta\phi_{CB}(i))-\sin\theta_i\sin\theta_{av}$, wherein $\theta_{av}$ is the quantized average elevation according to the second quantization scheme for the audio frame, $\theta_i$ is the elevation for a time frequency block i and $\Delta\phi_{CB}(i)$ is an approximation of the distortion between the azimuth and the azimuth component of the quantised mean removed azimuth vector according to the second quantization scheme for the time frequency block i; and
- select either the first quantization scheme or the second quantization scheme for quantising the elevation and the azimuth for all time frequency blocks of the sub band of the audio frame, wherein the selecting is dependent on the first and second distortion measures.

2. The apparatus as claimed in claim 1, wherein for the first quantization scheme the apparatus is caused to on a per time frequency block basis:

- quantize the elevation by selecting a closest elevation value from a set of elevation values on a spherical grid, wherein each elevation value in the set of elevation values is mapped to a set of azimuth values on the spherical grid; and
- quantize the azimuth by selecting a closest azimuth value from a set of azimuth values, where the set of azimuth values is dependent on the closest elevation value.

3. The apparatus as claimed in claim 2, wherein the number of elevation values in the set of elevation values is dependent on a bit resolution factor for the sub frame, and wherein the number of azimuth values in the set of azimuth values mapped to each elevation value is also dependent on the bit resolution factor for the sub frame.

4. The apparatus as claimed in claim 1, wherein the first distance measure comprises a L2 norm distance on a surface of a sphere between a point on the sphere given by the elevation and azimuth and a point on the sphere given by the quantized elevation and quantized azimuth according to the first quantization scheme.

5. The apparatus as claimed in claim 4, wherein the first distance measure is given by $1-\cos\hat{\theta}_i\cos\theta_i\cos(\Delta\phi_i)-\sin\theta_i\sin\hat{\theta}_i$, wherein $\theta_i$ is the elevation for a time frequency block i, wherein $\hat{\theta}_i$ is the quantized elevation according to the first quantization scheme for the time frequency block i and wherein $\Delta\phi_i$ is an approximation of a distortion between the azimuth and the quantized azimuth according to the first quantisation scheme for the time frequency block i.

6. The apparatus as claimed in claim 5, wherein the approximation of the distortion between the azimuth and the quantized azimuth according to the first quantization scheme is given as 180 degrees divided by $n_i$, wherein $n_1$ is the number of azimuth values in the set of azimuth values corresponding to the quantized elevation $\hat{\theta}_i$ according to the first quantization scheme for the time frequency block i.

7. The apparatus as claimed in claim 1, wherein the approximation of the distortion between the azimuth and the azimuth component of the quantised mean removed azimuth vector according to the second quantization scheme for the time frequency block i is a value associated with the codebook.

8. A method comprising:

providing for each time frequency block of a sub band of an audio frame a spatial audio parameter comprising an azimuth and an elevation;

determining a first distortion measure for the audio frame by determining a first distance measure for each time frequency block and summing the first distance measure for each time frequency block, wherein the first distance measure is an approximation of a distance between the elevation and azimuth and a quantized elevation a quantized azimuth according to a first quantisation scheme;

determining a second distortion measure for the audio frame by determining a second distance measure, according to a second quantisation scheme, for each time frequency block and summing the second distance measure for each time frequency block, wherein the second quantisation scheme comprises:

averaging the elevations of all time frequency blocks of the sub band of the audio frame to give an average elevation value;

averaging the azimuths of all time frequency blocks of the sub band of the audio frame to give an average azimuth value;

quantising the average value of elevation and the average value of azimuth;

forming a mean removed azimuth vector for the audio frame, wherein each component of the mean removed azimuth vector comprises a mean removed azimuth component for a time frequency block wherein the mean removed azimuth component for the time frequency block is formed by subtracting the quantized average value of azimuth from the azimuth associated with the time frequency block; and vector quantising the mean removed azimuth vector for the frame by using a codebook, and wherein the second distance measure is given by $1-\cos\theta_{av}\cos\theta_i\cos(\Delta\phi_{CB}(i))-\sin\theta_i\sin\theta_{av}$ wherein $\theta_{av}$ is the quantized average elevation according to the second quantization scheme for the audio frame, $\theta_i$ is the elevation for a time frequency block i and $\Delta\phi_{CB}(i)$ is an approximation of the distortion between the azimuth and the azimuth component of the quantised mean removed azimuth vector according to the second quantization scheme for the time frequency block i; and selecting either the first quantization scheme or the second quantization scheme for quantising the elevation and the azimuth for all time frequency blocks of the sub band of the audio frame, wherein the selecting is dependent on the first and second distortion measures.

9. The method as claimed in claim 8, wherein the first quantization scheme comprises on a per time frequency block basis:

quantizing the elevation by selecting a closest elevation value from a set of elevation values on a spherical grid, wherein each elevation value in the set of elevation values is mapped to a set of azimuth values on the spherical grid; and quantizing the azimuth by selecting a closest azimuth value from the set of azimuth values, where the set of azimuth values is dependent on the closest elevation value.

10. The method as claimed in claim 9, wherein the number of elevation values in the set of elevation values is dependent on a bit resolution factor for the sub frame, and wherein the number of azimuth values in the set of azimuth values mapped to each elevation value is also dependent on the bit resolution factor for the sub frame.

11. The method as claimed in claim 8, wherein the first distance measure comprises a L2 norm distance on a surface of a sphere between a point on the sphere given by the elevation and azimuth and a point on the sphere given by the quantized elevation and quantized azimuth according to the first quantization scheme.

12. The method as claimed in claim 11, wherein the first distance measure is given by $1-\cos\hat{\theta}_i\cos\theta_i\cos(\Delta\phi_i)-\sin\theta_i\sin\hat{\theta}_i$, wherein $\theta_i$ is the elevation for a time frequency block i, wherein $\hat{\theta}_i$ is the quantized elevation according to the first quantization scheme for the time frequency block i and wherein $\Delta\phi_i$ is an approximation of a distortion between the azimuth and the quantized azimuth according to the first quantisation scheme for the time frequency block i.

13. The method as claimed in claim 12, wherein the approximation of the distortion between the azimuth and the quantized azimuth according to the first quantization scheme is given as 180 degrees divided by $n_i$, wherein $n_i$ is the number of azimuth values in the set of azimuth values corresponding to the quantized elevation $\hat{\theta}_i$ according to the first quantization scheme for the time frequency block i.

14. The method as claimed in claim 8, wherein the approximation of the distortion between the azimuth and the azimuth component of the quantised mean removed azimuth vector according to the second quantization scheme for the time frequency block i is a value associated with the codebook.

* * * * *